W. WILMINGTON.
METHOD OF CASTING CAR WHEELS.
No. 10,742. Reissued June 29, 1886.
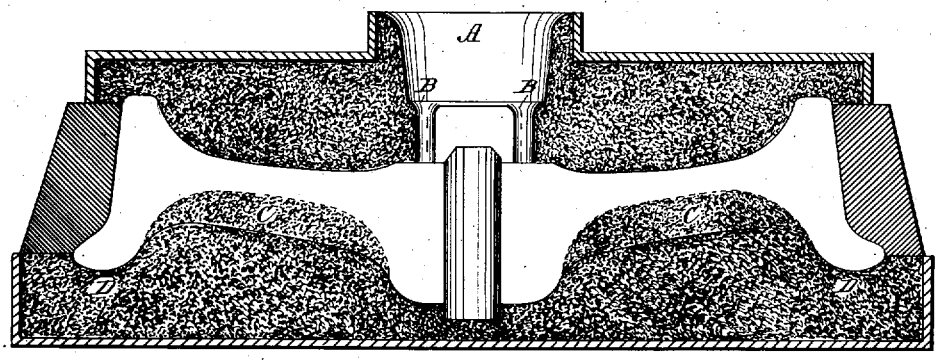
WITNESSES:
W. W. Hollingsworth
Edw. W. Byrn.
INVENTOR:
Wm. Wilmington
BY Munn & Co
ATTORNEYS.

UNITED STATES PATENT OFFICE.

WILLIAM WILMINGTON, OF TOLEDO, OHIO.

METHOD OF CASTING CAR-WHEELS.

SPECIFICATION forming part of Reissued Letters Patent No. 10,742, dated June 29, 1886.

Original No. 309,120, dated December 9, 1884. Application for reissue filed May 22, 1886. Serial No. 203,041.

*To all whom it may concern:*

Be it known that I, WILLIAM WILMINGTON, a citizen of the United States, residing at Toledo, in the county of Lucas and State of Ohio, have invented certain new and useful Improvements in Methods of Casting Car-Wheels, of which the following is a specification.

This invention relates to an improvement upon a method of casting car-wheels, upon which method Letters Patent No. 289,741 of the United States were granted me December 4, 1883. That method consists in placing finely-powdered ferro-manganese or its equivalent gradually in the stream of molten iron from the pouring-ladle, or in the receiving-basin of the mold, with the molten iron when the mold of the car-wheel is about three-fourths filled, the ferro-manganese being melted by contact with the molten iron and disseminated in the same in the hub and plate portions of the car-wheel. This method produces very beneficial effects upon the iron forming the hub and plate portions of cast-iron car-wheels, but not to the extent desired upon the iron composing the brackets and flange parts of the wheel, because at the time the ferro-manganese, or its equivalent, in combination with the inflowing iron, enters the mold, the iron already in the same, and filling the depressions in the drag forming the brackets and the back part of the flange, had become solidified to such an extent as to prevent the ferro-manganese or its equivalent from diffusing itself in these parts; consequently the iron forming these portions of the wheel remains substantially in its normal state. The objections to the same may be stated as follows: The flange of the car-wheel projects away from the main body of metal forming the rim of the wheel, and the metal forming the flange being inclosed by the chill and moist sand, the molten iron is suddenly solidified, and the same not having its chill-hardening properties modified by the diffusion of ferro-manganese through it, this causes the flange at times to be almost wholly white or chill-hardened, which lessens greatly the strength of the flange and is very objectionable.

The common method of forming brackets on the back part of cast-iron car-wheels imparts greater strength to the wheel at a less cost than any other known method; but brackets are to a certain extent objectionable because of their necessary form, the same being comparatively thin, and, projecting away from the plate of the wheel, the outer portions of the same are, next to the flange, the parts to cool first, leaving the same hard and rigid, and being connected with the hub-plate and rim of the wheel, and the same being in one piece, causes inherent strain upon the car-wheel, which increases the liability of the same to fracture while in use.

The object of my improvement is to overcome these difficulties; and to this end I modify the chill-hardening properties of molten cast-iron forming a car-wheel in varying degrees by a method of imparting rich ferro-manganese to the molten iron immediately before or at the time the iron is entering the mold of a car-wheel from the basin of the same, thus forming an admixture with the molten iron of rich ferro-manganese, or its equivalent, in varying quantities, whereby the iron composing the brackets and flange of the wheel is modified to an extent without materially affecting the tread of the wheel, and at a later period of filling the mold by placing greater quantities of ferro-manganese, or its equivalent, into the inflowing iron forming the hub and inner plates, which will further modify the chilling properties of the iron forming the same.

In practicing my improvement of casting chilled-tread cast-iron car-wheels, I use the common forms of double or single plated car-wheel molds having various forms of depressions in the drag of the same to impart form to a series of brackets, and also the back part of the flange of the wheel. The mold being in a horizontal position, I take in a pouring-ladle a required quantity of molten chill-hardening cast-iron, or other suitable combination of cast-iron and steel for car-wheels, and commence to fill the mold of a car-wheel in the ordinary manner, with the exception or addition of the following process: At the time or immediately after commencing to fill the mold I commence to place gradually into the current of molten iron from the pouring-ladle, or into the receiving-basin of the mold with the molten iron, rich and finely-powdered or granulated ferro-manganese, or its equivalent, allowing the same to be melted and disseminated by the inherent heat in the molten iron in the flowing stream of the same, or in the basin. The continuous flow of molten iron will carry with it into the mold the ferro-manganese, and the same being diffused in the iron, filling the depressions in the drag forming the brackets and flange, will modify the chilling properties of the same. The continuing inflow of molten iron at this time having greater quantities of ferro-manganese, or its equivalent, in mixture, finally fills the mold, whereby the iron forming the hub and inner plates is still further modified in its chilling properties, and thus securing to the car-wheel great strength.

To modify the iron forming these parts of cast-iron car-wheels, I prefer to use by my process very rich ferro-manganese, which may be from seventy-five to ninety per cent., because it takes less to produce the desired results; but I do not confine myself to the use of rich ferro-manganese alone to alloy certain parts of cast-iron car-wheels, but I may use to modify the chilling properties of some qualities of chill-hardening cast-iron small particles of spiegeleisen, or small particles of cast-iron having large portions of manganese or uncombined carbon in their composition. I also use to alloy by my process suitable combinations of cast-iron and steel for chilled-tread car-wheels any required combination of the above-named alloying metals in such proportions as the quality of the molten product requires to produce the character of car-wheel desired.

I have found in practice that about three ounces of eighty per cent. ferro-manganese to each one hundred pounds of iron in the wheel produces very beneficial effects in modifying the iron-forming portions of cast-iron car-wheels; but I use greater proportions of the alloying equivalents named, the quantity depending upon the chilling properties of the molten product from which the car-wheel is to be cast by my method, as described above.

The accompanying drawing represents a central cross-section of the mold of car-wheel; A, the basin; B, the inflowing openings; C, depressions in the drag forming the brackets; D, another depression in the drag forming the back part of the flange.

The distinctive features of my invention consist in imparting rich ferro-manganese, or its equivalent, to molten chill-hardening cast-iron at or about the time the same is first entering the mold of a car-wheel, whereby the projecting portions of the iron of the wheel in the drag are lessened in their chill-hardening properties, and at a later period of the filling of the mold imparting greater quantities of ferro-manganese to the iron flowing into the mold.

For the benefit of others I will make some statements in relation to the qualities of cast-iron and the effects produced by carbon and manganese upon the quality of cast-iron which I prefer to use in producing a cheap, strong, and durable car-wheel.

While the proper proportions of carbon and manganese increase the strength and fluidity of the cast-iron which I use, they will also, when in excess in the iron composing the tread of a car-wheel, impair the durability of the same. Therefore I limit the quantity of ferro-manganese having carbon and manganese in combination, admitted to the iron at and near the surface of the tread of the car-wheel.

In carrying my improved method into operation I melt in a cupola in the ordinary manner the desired quantities of old or condemned car-wheels, the same having the qualities usually found therein.

To produce a five-hundred-and-fifty-pound car-wheel, I use about one and a half pound of about eighty per cent. ferro-manganese finely powdered. Care must be taken not to let the molten iron in the basin of the mold run too low, as the same will carry with it into the mold the coarser particles of ferro-manganese in an unmelted state, which is objectionable.

The molten iron derived from old car-wheels by repeated melting has been in a great measure deprived of its carbon and manganese, and is very high in chill-hardening properties. This quality of cast-iron produces the best results by my method.

My method in the art of casting chilled-tread cast-iron car-wheels is contradistinctive to all other methods, from the fact that molten iron of the quality derived from old car-wheels, if cast in its normal state into the brackets and flange parts of a car-wheel, would be worthless, because when cold it is nearly white in color, hard and rigid, having but little strength; but when I restore to the molten iron, in varying quantities, carbon and manganese, then the same becomes soft and strong.

In all other methods of casting chilled-tread cast-iron car-wheels, to secure the best results for the tread-brackets and flange parts of a car-wheel it is absolutely necessary to use a cast-iron having in natural combination the proper proportions of carbon and manganese before commencing to cast a car-wheel.

It is the property of molten cast-iron to have an intense affinity to combine by diffusion with a different quality of cast-iron having greater or lesser quantities of carbon and manganese in combination. I utilize this law of combination to incorporate small and increasing quantities of ferro-manganese with the molten iron during the casting of a car-wheel, the effect of which is to diminish the intensity for diffusion of the carbon and manganese in the later incoming molten iron, with the molten iron already in the mold having a less quantity of carbon and manganese in mixture. I am thereby enabled to limit the quantities of carbon and manganese in the iron at and near the surface of the tread of the car-wheel; consequently the same will be durable.

What I claim as my invention is—

The method of casting car-wheels, which consists in placing gradually into the stream of molten metal, or in the receiving-basin of a car-wheel mold at or about the time of the first entering of molten-metal product into the mold, rich and finely powdered or granulated ferro-manganese, or its equivalent, whereby the same is melted and disseminated by the inherent heat in the current of molten iron from the pouring-ladle, or in the molten iron in the receiving-basin of the mold, and at a later period increasing the proportion of ferro-manganese, substantially as and for the purpose described.

WILLIAM WILMINGTON.

Witnesses:
LINCOLN HAYS,
GEO. MILLER, JR.